United States Patent
Wu et al.

(10) Patent No.: US 11,970,201 B2
(45) Date of Patent: Apr. 30, 2024

(54) BABY STROLLER AND SEAT COVER ASSEMBLY THEREOF

(71) Applicant: WONDERLAND SWITZERLAND AG, Steinhausen (CH)

(72) Inventors: Bo Wu, Steinhausen (CH); Liyi Wang, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/899,763

(22) Filed: Aug. 31, 2022

(65) Prior Publication Data

US 2023/0067180 A1 Mar. 2, 2023

(30) Foreign Application Priority Data

Aug. 31, 2021 (CN) .......................... 202122090655.0

(51) Int. Cl.
  *B62B 9/00* (2006.01)
  *B62B 9/10* (2006.01)
  *B62B 9/14* (2006.01)

(52) U.S. Cl.
  CPC .............. *B62B 9/102* (2013.01); *B62B 9/142* (2013.01)

(58) Field of Classification Search
  CPC ......... B62B 9/108; B62B 9/102; B62B 9/142; B62B 9/00; B60N 2/6036; B60N 2/6027; B60N 2/60; B60N 2/28
  USPC ........................................................ 280/642
  See application file for complete search history.

(56) References Cited

U.S. PATENT DOCUMENTS

| 4,173,355 | A | | 11/1979 | Perego | |
|---|---|---|---|---|---|
| 4,335,893 | A | * | 6/1982 | Carmichael | B62B 7/08 280/42 |
| 4,457,032 | A | * | 7/1984 | Clarke | B60N 2/60 297/382 |
| 4,577,355 | A | | 3/1986 | Kassai | |
| 4,930,165 | A | * | 6/1990 | Wilson | A47K 13/00 4/245.3 |

(Continued)

FOREIGN PATENT DOCUMENTS

| CN | 104843044 A | * | 8/2015 | ............. B62B 7/066 |
|---|---|---|---|---|
| CN | 104843044 A | | 8/2015 | |

(Continued)

OTHER PUBLICATIONS

Translation of CN104843044A , accessed on Aug. 26, 2023 at www.espacenet.com (Year: 2015).*

(Continued)

*Primary Examiner* — John D Walters
*Assistant Examiner* — Hilary L Johns
(74) *Attorney, Agent, or Firm* — HAUPTMAN HAM, LLP (57) ABSTRACT

The present disclosure relates to a seat cover assembly of a baby stroller including a seat cover, a support structure and a pivot portion. The support structure is disposed in the seat cover and includes a first plate member and a second plate member that are movably connected. A seam is formed between the first plate member and the second plate member, and a width of the seam is less than a sum of a thickness of the first plate member and a thickness of the second plate member. The pivot portion is opposite the seam and close to a surface of the first plate member and a surface of the second plate member.

20 Claims, 9 Drawing Sheets

(56) References Cited

U.S. PATENT DOCUMENTS

| | | | | |
|---|---|---|---|---|
| 5,244,222 | A * | 9/1993 | Benoit | A61G 5/08 280/647 |
| 5,285,535 | A * | 2/1994 | Stewart | A61G 5/1002 4/480 |
| 5,752,738 | A * | 5/1998 | Onishi | B62B 7/123 297/380 |
| 6,135,475 | A * | 10/2000 | Brown | A61G 5/0833 280/42 |
| 6,666,509 | B2 * | 12/2003 | Matsushima | A47C 7/46 297/219.1 |
| 7,364,228 | B2 * | 4/2008 | Entz | A61G 5/0891 280/647 |
| 8,083,252 | B2 * | 12/2011 | Wagner | A61G 5/1054 297/42 |
| 8,419,047 | B2 * | 4/2013 | Chen | A61G 5/0816 280/647 |
| 8,746,265 | B2 * | 6/2014 | Nilsson | A61G 5/10 297/42 |
| 2001/0013688 | A1 * | 8/2001 | Warner, Jr. | B62B 7/08 280/47.38 |
| 2001/0022459 | A1 * | 9/2001 | Matsushima | B60N 2/663 297/284.4 |
| 2004/0160111 | A1 * | 8/2004 | Koffler | A47C 7/029 297/452.21 |
| 2010/0194077 | A1 * | 8/2010 | Wagner | A61G 5/1054 280/650 |
| 2019/0029474 | A1 * | 1/2019 | Preece | A47K 3/282 |
| 2019/0263298 | A1 * | 8/2019 | Gay | B60N 2/2881 |
| 2022/0144330 | A1 * | 5/2022 | Bowman | B62B 3/007 |

FOREIGN PATENT DOCUMENTS

| | | | |
|---|---|---|---|
| CN | 207510565 U | 6/2018 | |
| CN | 104176100 B | 8/2018 | |
| EP | 1442956 A1 | 8/2004 | |
| EP | 2907724 B1 | 5/2017 | |
| FR | 2551013 A1 | 3/1985 | |
| JP | 2016193653 A | 11/2016 | |
| WO | WO-2005080171 A2 * | 9/2005 | B62B 7/08 |
| WO | WO-2020185671 A1 * | 9/2020 | B62B 5/0003 |
| WO | 2021144224 A1 | 7/2021 | |

OTHER PUBLICATIONS

Taiwan Office Action issued in corresponding Taiwan Application No. 111132434, dated Mar. 3, 2023, pp. 1-17.

* cited by examiner

FIG. 1

Prior Art

FIG. 14

# BABY STROLLER AND SEAT COVER ASSEMBLY THEREOF

CROSS REFERENCE TO RELATED APPLICATION

This application claims priority of Chinese Patent Application No. 2021220906550, entitled "BABY STROLLER AND SEAT COVER ASSEMBLY THEREOF", filed on Aug. 31, 2021, the entire content of which is incorporated herein by reference.

TECHNICAL FIELD

The present disclosure relates to baby products, in particular to a baby stroller and a seat cover assembly thereof.

BACKGROUND

Baby strollers configured to transport babies are currently available on the market with a variety of styles and structures. The baby stroller usually composes a frame and a seat cover that wraps around the frame. When not in use, the baby stroller can be folded for easy storage or transport.

Figure 1:
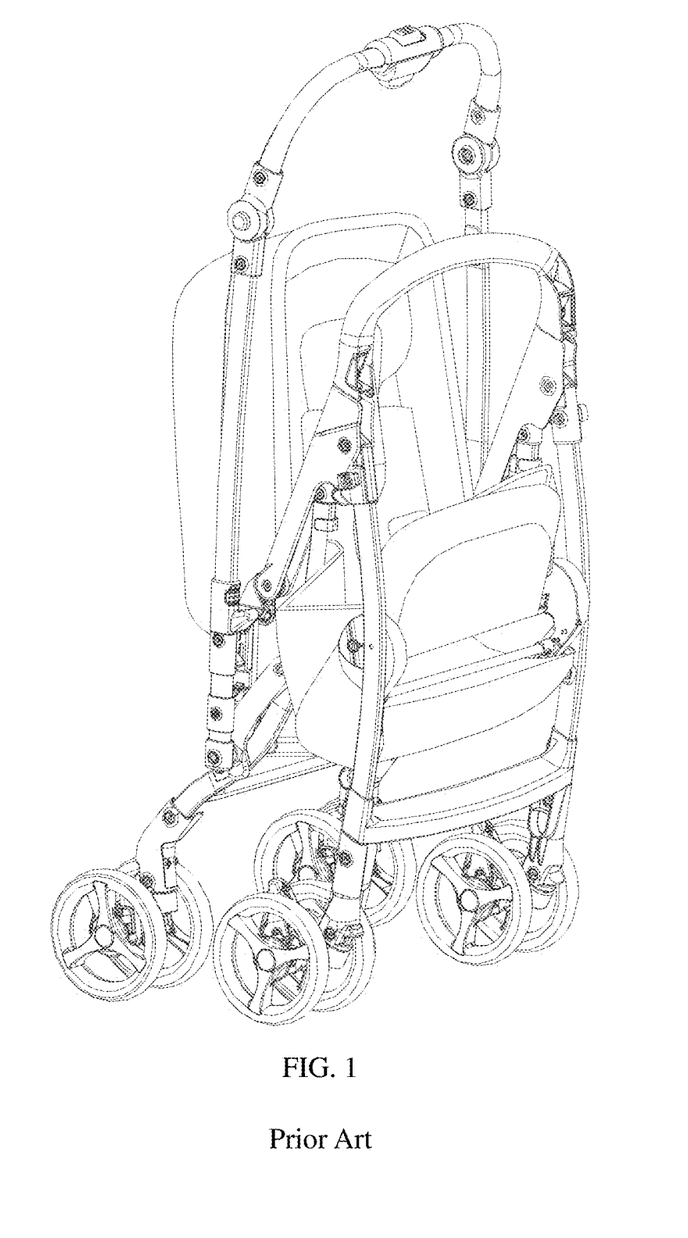
FIG. 1 is a perspective view of a conventional baby stroller when folded.

Currently, the conventional foldable baby stroller has the following shortcomings in long-term use. When the frame of the baby stroller is folded, the seat cover will also be folded correspondingly. However, since the seat cover is generally made of soft material and is difficult to control a folding direction thereof, sometimes the seat cover may not be properly folded inwardly but will protrude from the frame, as shown in FIG. 1. This incorrect folding manner of the seat cover will not only affect the appearance of the baby stroller, but may also affect the folding and unfolding of the frame, which brings inconvenience to the user.

SUMMARY

According to some embodiments, a seat cover assembly with a controllable folding direction and a baby stroller using the seat cover assembly are provided.

A seat cover assembly of a baby stroller includes a seat cover, a support structure and a pivot portion. The support structure is disposed in the seat cover and includes a first plate member and a second plate member. The first plate member and the second plate member are movably connected. A seam is formed between the first plate member and the second plate member, and a width of the seam is less than a sum of a thickness of the first plate member and a thickness of the second plate member. The pivot portion is disposed opposite the seam and close to a surface of the first plate member and a surface of the second plate member.

A seat cover assembly of a baby stroller includes a seat cover and a support structure. The support structure is disposed in the seat cover and includes a first plate member and a second plate member. The first plate member and the second plate member are movably connected. A seam and a pivot portion disposed opposite the seam are formed between the first plate member and the second plate member, and the first plate member can only rotate between 0° and 180° with respect to the second plate member around the pivot portion.

A baby stroller includes the seat cover assembly according to any one of the aforementioned embodiments.

These and other objects, advantages, purposes and features will become apparent upon review of the following specification in conjunction with the drawings.

BRIEF DESCRIPTION OF THE DRAWINGS

In order to illustrate the technical solutions of the embodiments of the present disclosure more clearly, the accompanying drawings required in the embodiments of the present disclosure will be briefly introduced below. Obviously, the drawings described below are only some embodiments of the present disclosure, and for those of ordinary skill in the art, other drawings can also be obtained from these drawings without creative effort.

DETAILED DESCRIPTION OF THE EMBODIMENTS

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
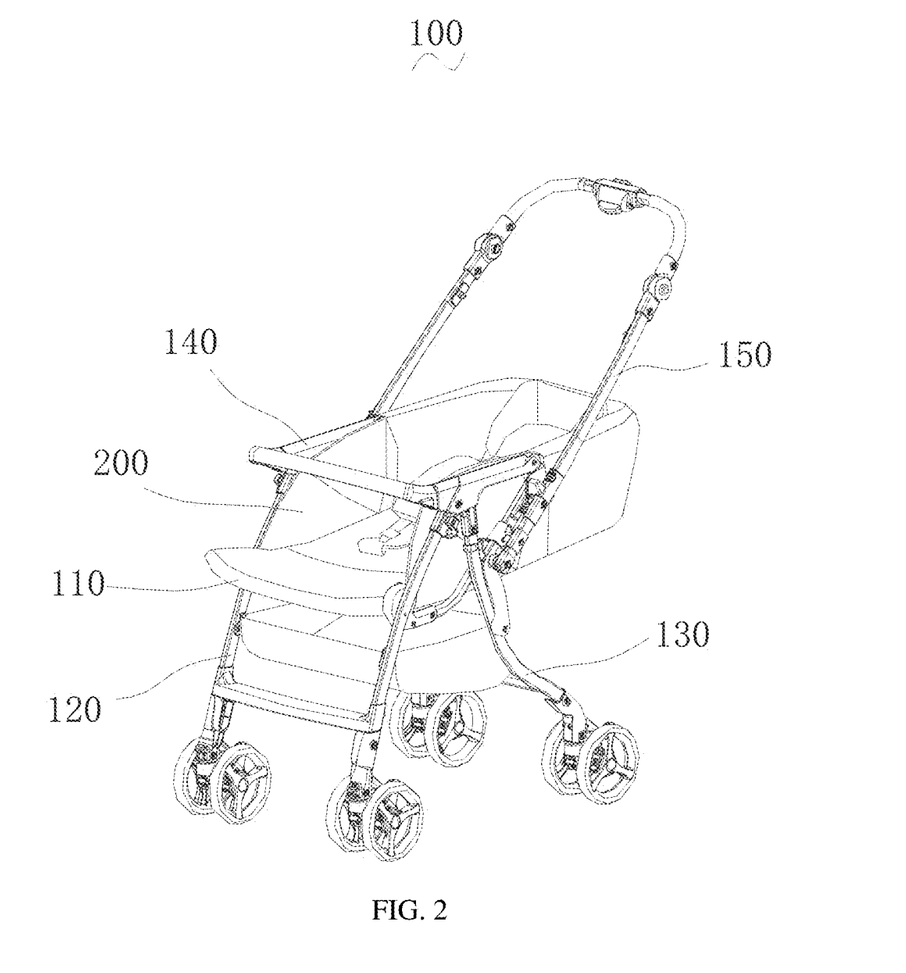
FIG. 2 is a perspective view of a baby stroller according to an embodiment in an unfolded state.
Figure 3:
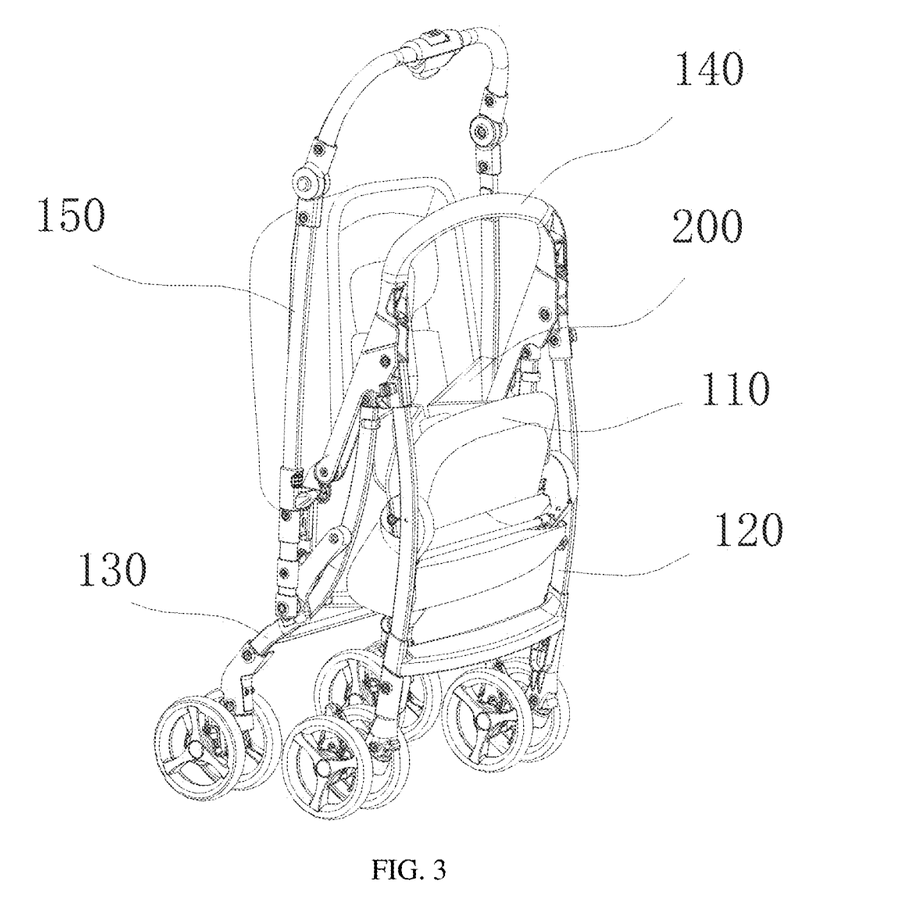
FIG. 3 is a perspective view of the baby stroller shown in FIG. 2 in a folded state.

Referring to FIG. 2, a baby stroller 100 according to an embodiment includes a seat 110 configured for an infant to sit on, a front wheel frame 120 disposed on a front side of the seat 110, a rear wheel frame 130 disposed on a rear side of the seat 110, an armrest 140 disposed above the seat 110, and a handle 150 disposed above the rear wheel frame 130. The aforementioned components are pivotally connected to each other, such that the baby stroller 100 can be switched between an unfolded state shown in FIG. 2 and a folded state shown in FIG. 3.

As shown in FIG. 2, the baby stroller 100 further includes a seat cover assembly 200 disposed on the armrest 140 and the seat 110. The seat cover assembly 200 are provided on both sides of the seat 10, respectively, which serves to block the wind, shield the sunlight, and prevent the baby from slipping and falling down. The seat cover assembly 200 includes a support structure 20 (see FIG. 4) and a seat cover (not labeled) covering a surface of the support structure 20. The seat cover can be made of cotton, nylon, or flax.

Figure 4:
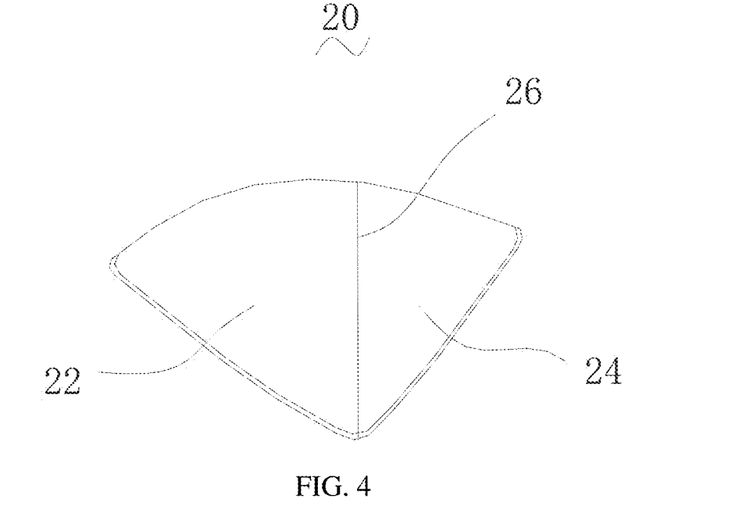
FIG. 4 is a schematic front view of a support structure according to an embodiment.
Figure 5:
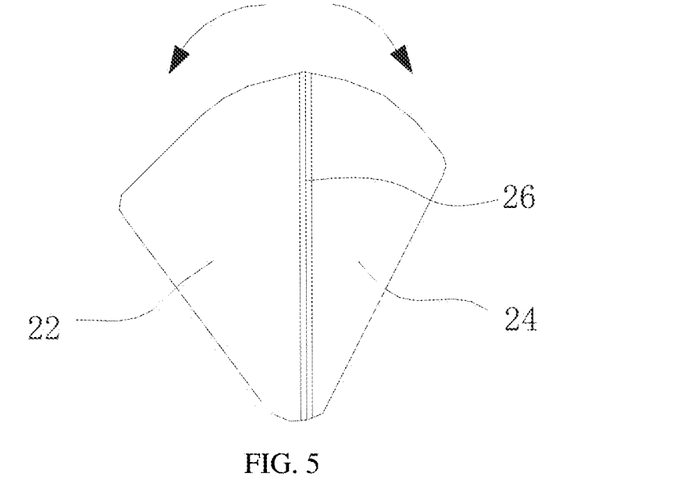
FIG. 5 is a schematic view illustrating the support structure shown in FIG. 4 when bent.
Figure 6:
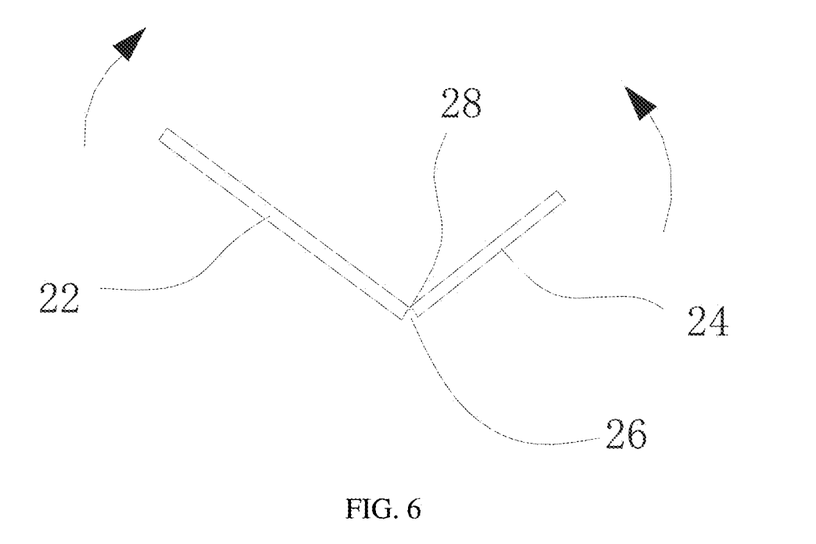
FIG. 6 is a top view of the support structure shown in FIG. 4 when bent.
Figure 7:
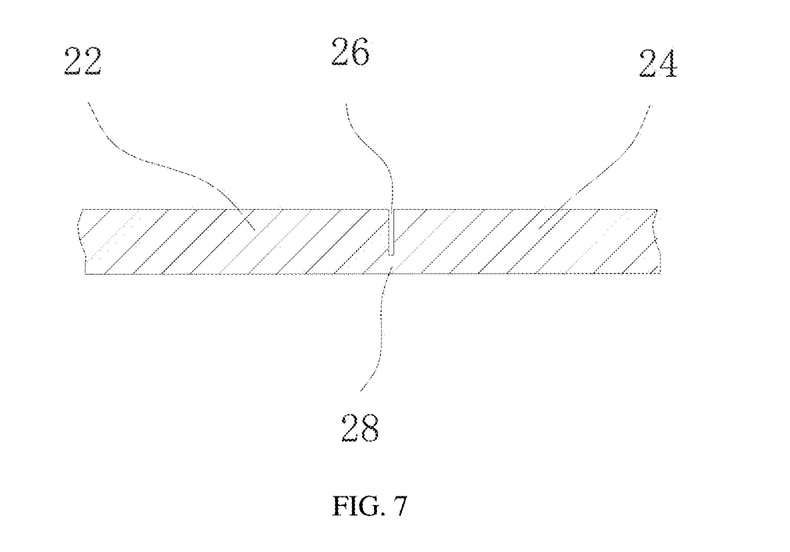
FIG. 7 is a cross-sectional view of the support structure shown in FIG. 4.

Referring to FIG. 4, the support structure 20 according to a first embodiment is substantially fan-shaped, and includes a first plate member 22 and a second plate member 24 that are movably connected. The first plate member 22 and the second plate member 24 have a certain hardness to support the seat cover. The first plate member 22 and the second plate member 24 are made of the same material, such as PE, PP or EVA. As shown in FIG. 7, a seam 26 and a pivot portion 28 opposite the seam 26 are formed between the first plate member 22 and the second plate member 24. The pivot portion 28 is close to a surface of the first plate member 22 and a surface of the second plate member 24. In this embodiment, the first plate member 22, the second plate member 24, and the pivot portion 28 are one-piece-formed. In this case, the support structure 20 may be manufactured by the following steps: firstly a whole piece of PE plate (or the aforementioned PP plate or EVA plate) is provided, and then a groove which does not cut the PE plate is formed through a surface of the PE plate. The groove will form the aforementioned seam 26, and a part where the PE plates on a left side and a right side are still connected will form the aforementioned pivot portion 28. In this embodiment, a width (in a transverse direction) of the seam 26 is less than a thickness of the first plate member 22 or a thickness of the second plate member 24, and is also less than a sum of the thickness of the first plate member 22 and the thickness of the second plate member 24. As shown in FIG. 5, since the seam 26 and the pivot portion 28 are formed between the first plate member 22 and the second plate member 24, the first plate member 22 and the second plate member 24 can be folded with respect to each other, but can only be folded toward one direction, while folding in the other direction is prevented due to the thickness of the first plate member 22 and the thickness of the second plate member 24. For example, as shown in FIG. 6, taking the first plate member 22 as a reference, the second plate member 24 can only rotate around the pivot portion 28 in a counterclockwise direction, but cannot rotate in a clockwise direction, and a maximum rotation angle is 180°. Conversely, taking the second plate member 24 as a reference, the first plate member 22 can only rotate clockwise around the pivot portion 28, but cannot rotate counterclockwise, and the maximum rotation angle is also 180°. As such, when the baby stroller 100 is in a folded state shown in FIG. 3, the first plate member 22 and the second plate member 24 of the seat cover assembly 200 can only be folded inward, that is, folded toward each other, but cannot be folded in an outward convex manner shown in FIG. 1, such that the seat cover assembly 200 can be folded in a correct direction, which can reduce an occupied space of the baby stroller 100 after being folded, and is more convenient to use.

It should be understood that, in another embodiment, a rotating shaft having a shape of a cylinder may also be embedded in the pivot portion 28, so as to better guide a rotation between the first plate member 22 and the second plate member 24.

Figure 8:
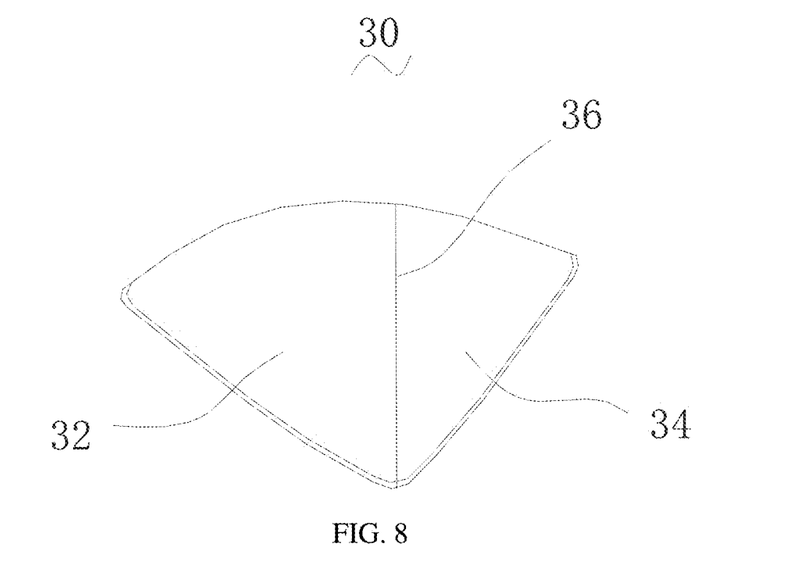
FIG. 8 is a schematic front view of a support structure according to another embodiment.
Figure 9:
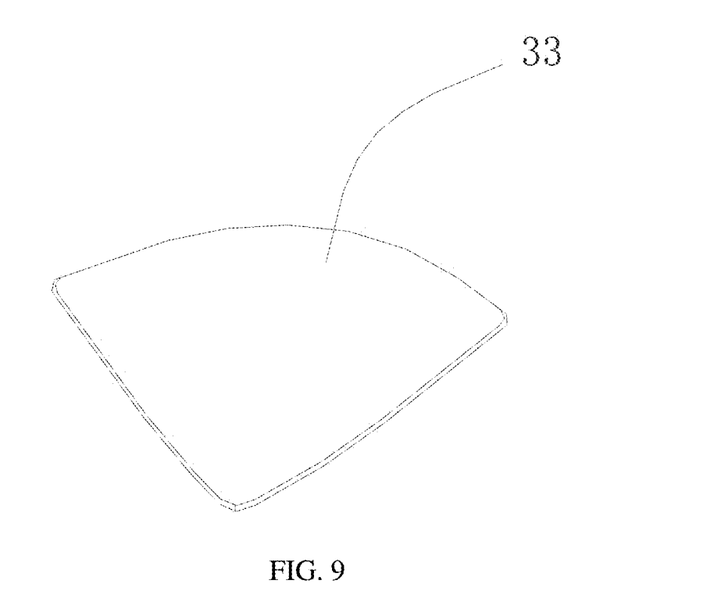
FIG. 9 is a schematic rear view the support structure shown in FIG. 8.
Figure 10:
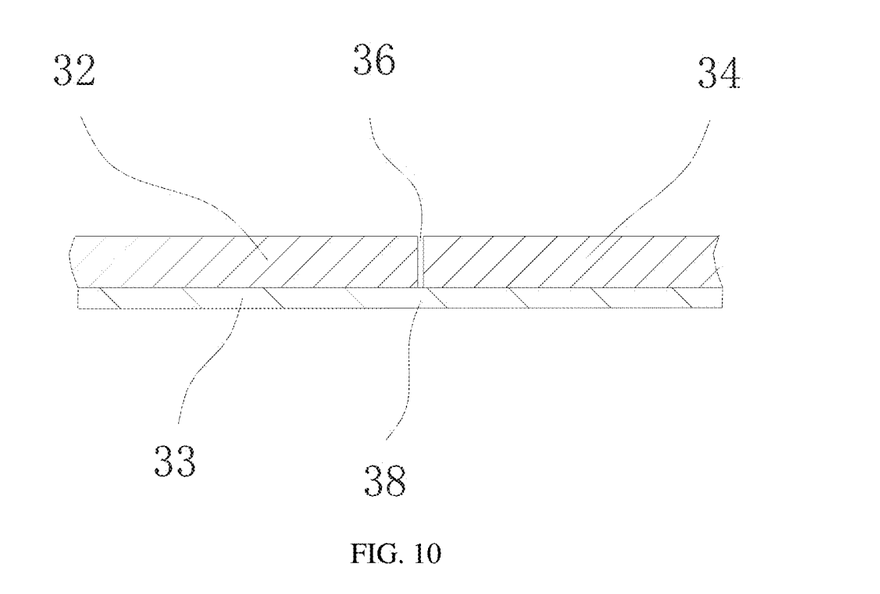
FIG. 10 is a cross-sectional view of the support structure shown in FIG. 8.

Referring to FIGS. 8 to 10, a support structure 30 according to a second embodiment is similar to the support structure 20 according to the first embodiment, while the difference is that the support structure 30 includes a first plate member 32 and a second plate member 34 that are completely separated from each other, and the support structure 30 further includes a flexible pad 33 covering a side surface of the first plate member 32 and a side surface of the second plate member 34. The flexible pad 33 may be made of heat insulation materials, such as ordinary cloth or aluminum foil. A seam 36 is formed between the first plate member 32 and the second plate member 34. A portion of the flexible pad 33 opposite the seam 36 is a pivot portion 38. During manufacturing, the flexible pad 33 is attached to the surfaces of the first plate member 32 and the second plate member 34. The first plate member 32 is separated from the second plate member 34, and the seam 36 is formed between the flexible pad 33 and the second plate member 34. Based on the same principle as the first embodiment, due to the existence of the seam 36 and the pivot portion 38, the first plate member 32 and the second plate member 34 can be folded with respect to each other, but can only be folded toward one direction, and the folding in the other direction is prevented due to a thickness of the first plate member 32 and a thickness of the second plate member 34.

Figure 11:
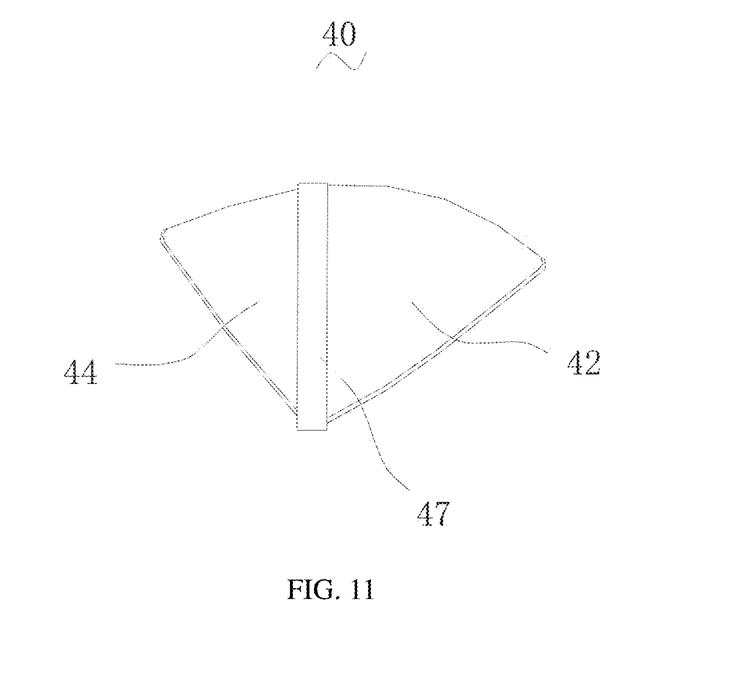
FIG. 11 is a schematic front view of a support structure according to another embodiment.
Figure 12:
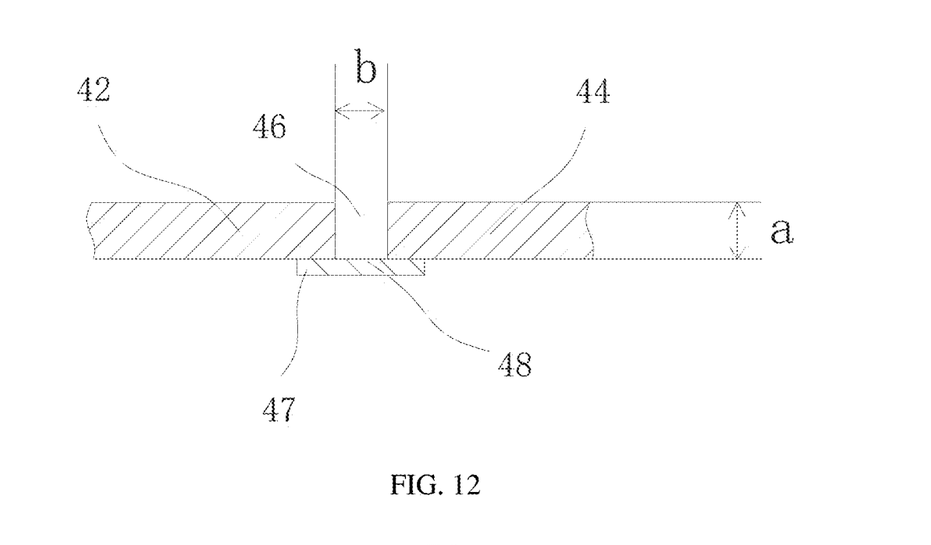
FIG. 12 is a cross-sectional view of the support structure shown in FIG. 11.

Referring to FIGS. 11 to 12, a support structure 40 according to a third embodiment is similar to the support structure 30 of the second embodiment, the difference is that the support structure 40 includes a first plate member 42 and a second plate member 44 that are completely separated, and further includes a flexible joint strip 47 disposed at a joint of the first plate member 42 and the second plate member 44, and a pivot portion 48 is formed on the flexible joint strip 47. Since the flexible joint strip 47 is only provided at the joint of the first plate member 42 and the second plate member 44, the overall thickness of the support structure 40 of the third embodiment can be further reduced compared with that in the second embodiment. As shown in FIG. 12, assuming that a width of the seam 46 between the first plate member 42 and the second plate member 44 is b, and a thickness of the first plate member 42 or the second plate member 44 is a, then it is required that b<2a. If the width of the seam 46 is too large, a problem that the first plate member 42 and the second plate member 44 can be folded in both directions may be occurred.

Figure 13:
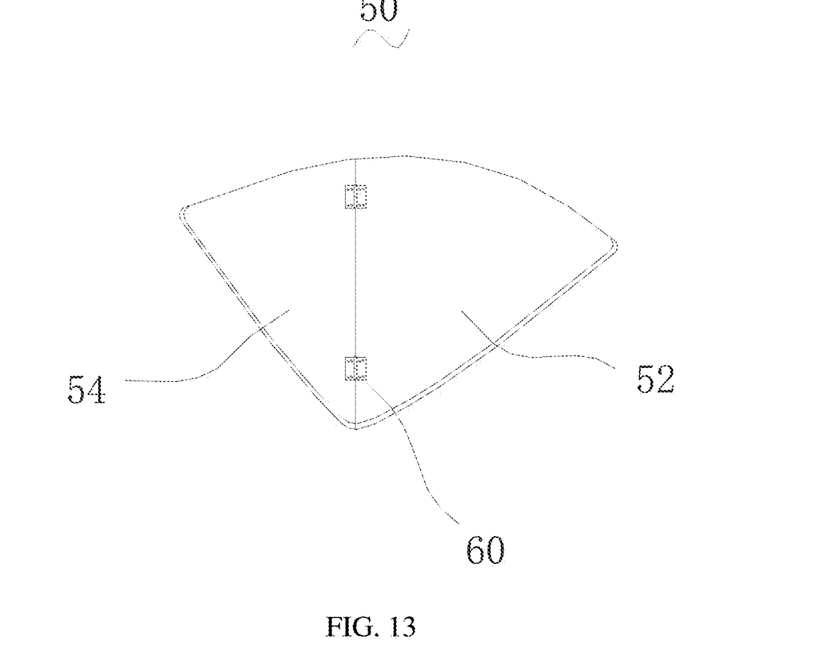
FIG. 13 is a schematic front view of a support structure according to another embodiment.
Figure 14:
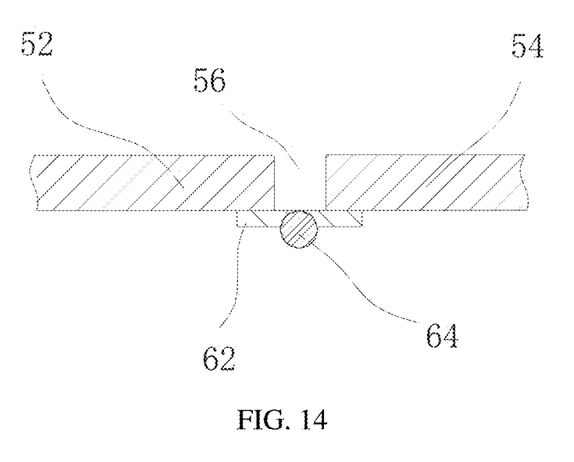
FIG. 14 is a cross-sectional view of the support structure shown in FIG. 13.

Referring to FIGS. 13 to 14, a support structure 50 according to a fourth embodiment is similar to the support structure 40 of the third embodiment, the difference is that the support structure 50 includes a first plate member 52 and a second plate member 54 that are completely separated, and further includes a plurality of hinges 60 disposed at a joint of the first plate member 52 and the second plate member 54. Each hinge 60 includes a left hinge sheet 62, a right hinge sheet 62, and a rotating shaft 64. The two hinge sheets 62 are fixed to the first plate member 52 and the second plate member 54, respectively, and the rotating shaft 64 forms a pivot portion. Based on a similar principle, due to the existence of the seam 56 and the hinge 60, the first plate member 52 and the second plate member 54 can be folded with respect to each other, but can only be folded toward one direction, and folding in the other direction is prevented due to a thickness of first plate member 52 and a thickness of the second plate member 54.

The technical features of the aforementioned embodiments may be combined arbitrarily. To simplify the description, not all the possible combinations of the technical features in the aforementioned embodiments are described. However, all of the combinations of these technical features should be considered as within the scope of the present disclosure, as long as such combinations do not contradict with each other.

The detailed embodiments described herein are only for the purpose of illustrating the present disclosure, and are not intended to limit the scope of the present disclosure in any way. It would be understood by a person skilled in the art that various changes and modifications can be made to the embodiments described herein without departing from the scope and spirit of the present disclosure. Therefore, the protection scope of the present disclosure should be defined by the following claims.

What is claimed is:

1. A seat cover assembly of a baby stroller, comprising:
   a seat cover;
   a support structure disposed in the seat cover and comprising a first plate member and a second plate member, wherein the first plate member and the second plate member are movably connected, and a seam is formed between the first plate member and the second plate member, and a width of the seam is greater than zero and less than a sum of a thickness of the first plate member and a thickness of the second plate member; and
   a pivot portion disposed opposite the seam and close to a surface of the first plate member and a surface of the second plate member.

2. The seat cover assembly according to claim 1, wherein the first plate member, the second plate member, and the pivot portion are one-piece-formed.

3. The seat cover assembly according to claim 1, wherein the support structure further comprises a flexible pad covering the first plate member and the second plate member, and the pivot portion is formed on the flexible pad.

4. The seat cover assembly according to claim 3, wherein the flexible pad is made of aluminum foil.

5. A seat cover assembly of a baby stroller, comprising:
   a seat cover;
   a support structure in the seat cover and comprising a first plate member and a second plate member, wherein the first plate member and the second plate member are movably connected, and a seam is between the first plate member and the second plate member, and a width of the seam is less than a sum of a thickness of the first plate member and a thickness of the second plate member; and
   a pivot portion opposite the seam and close to a surface of the first plate member and a surface of the second plate member, wherein the support structure further comprises a flexible joint strip disposed at a joint of the first plate member and the second plate member, and the pivot portion is formed on the flexible joint strip.

6. The seat cover assembly according to claim 1, wherein the pivot portion is provided with a rotating shaft.

7. The seat cover assembly according to claim 1, wherein the support structure further comprises a hinge disposed between the first plate member and the second plate member, and the pivot portion is a rotating shaft of the hinge.

8. The seat cover assembly according to claim 1, wherein the first plate member and the second plate member are made of ethylene-vinyl acetate copolymer, polypropylene or polyethylene.

9. The seat cover assembly according to claim 1, wherein the seat cover is made of cotton, nylon, or flax.

10. A seat cover assembly of a baby stroller, comprising:
    a seat cover; and
    a support structure disposed in the seat cover and comprising a first plate member and a second plate member that are movably connected,
    wherein
    a seam and a pivot portion disposed opposite the seam are formed between the first plate member and the second plate member,
    a width of the seam is greater than zero and less than a sum of a thickness of the first plate member and a thickness of the second plate member, and
    the first plate member is configured to only rotate between 0° and 180° with respect to the second plate member around the pivot portion.

11. The seat cover assembly according to claim 10, wherein the support structure further comprises a flexible pad covering the first plate member and the second plate member, and the pivot portion is formed on the flexible pad.

12. The seat cover assembly according to claim 11, wherein the flexible pad is made of aluminum foil.

13. The seat cover assembly according to claim 10, wherein the support structure further comprises a flexible joint strip disposed at a joint of the first plate member and the second plate member, and the pivot portion is formed on the flexible joint strip.

14. The seat cover assembly according to claim 10, wherein the support structure further comprises a hinge disposed between the first plate member and the second plate member, and the pivot portion is a rotating shaft of the hinge.

15. The seat cover assembly according to claim 10, wherein the first plate member and the second plate member are made of polyethylene, polypropylene or ethylene-vinyl acetate copolymer.

16. The seat cover assembly according to claim 10, wherein the seat cover is made of cotton, nylon, or flax.

17. A baby stroller, comprising the seat cover assembly according to claim 1.

18. The baby stroller according to claim 17, wherein the first plate member, the second plate member, and the pivot portion are one-piece-formed.

19. The baby stroller according to claim 17, wherein the support structure further comprises a flexible pad covering the first plate member and the second plate member, and the pivot portion is formed on the flexible pad.

20. The baby stroller according to claim 19, wherein the flexible pad is made of aluminum foil.

* * * * *